United States Patent
Liu

(10) Patent No.: US 6,987,515 B2
(45) Date of Patent: Jan. 17, 2006

(54) METHOD FOR SMOOTH TRANSITION BETWEEN PRE-RENDERED MODE AND REAL-TIME MODE

(75) Inventor: Casper Liu, Taipei (TW)

(73) Assignee: Ulead Systems, Inc., Taipei (TW)

( * ) Notice: Subject to any disclaimer, the term of this patent is extended or adjusted under 35 U.S.C. 154(b) by 1013 days.

(21) Appl. No.: 09/930,970

(22) Filed: Aug. 17, 2001

(65) Prior Publication Data
US 2002/0190990 A1 Dec. 19, 2002

(30) Foreign Application Priority Data
Jun. 13, 2001 (TW) .............................. 90114283 A

(51) Int. Cl.
*G06T 11/60* (2006.01)
(52) U.S. Cl. .................................................... 345/473
(58) Field of Classification Search ................ 345/418, 345/473, 474, 475
See application file for complete search history.

(56) References Cited

U.S. PATENT DOCUMENTS

| | | | |
|---|---|---|---|
| 6,278,455 B1 * | 8/2001 | Baker | 715/716 |
| 6,331,861 B1 * | 12/2001 | Gever et al. | 345/629 |
| 6,628,286 B1 * | 9/2003 | Comair et al. | 345/473 |

* cited by examiner

*Primary Examiner*—Matthew C. Bella
*Assistant Examiner*—Cliff Vo
(74) *Attorney, Agent, or Firm*—Birch, Stewart, Kolasch & Birch, LLP

(57) ABSTRACT

A method for smooth transition between pre-rendered mode and real-time mode. First, a plurality of precast pictures having a set order are provided, each including an object and an object-position corresponding to the object. Then, a former position and a current position of a pointer are recorded in real-time mode. If real-time mode switches to pre-rendered mode, the precast picture whose object-position is closest to the current position is selected as a starting picture. Then, a played direction according to the former position and the current position is obtained. Finally, the precast pictures from the starting picture according to the played direction and the set order are played.

7 Claims, 5 Drawing Sheets

METHOD FOR SMOOTH TRANSITION BETWEEN PRE-RENDERED MODE AND REAL-TIME MODE

BACKGROUND OF THE INVENTION

1. Field of the Invention

The present invention relates to a method for smooth transition between pre-rendered mode and real-time mode, and particularly to a method for smooth transition that alleviates non-continuous appearance when real-time mode switches to pre-rendered mode.

2. Description of the Related Art

Currently, in interactive animation environments, there are two kinds of operating mode, pre-rendered and real-time. If there is no signal input to an interactive animation, the interactive animation switches to pre-rendered mode, and the interactive animation only plays and exhibits the animation effects in the pre-rendered mode.

A signal may be input to the interactive animation, wherein the signal is controlled by a pointing device such as a two-button mouse device. Then, the interactive animation switches to real-time mode, and creates images according to the input signal in real time. If the input signal ceases, the interactive animation switches back to pre-rendered mode, to continue playing and exhibiting the animation effect.

However, due to inadequate system resources, the pictures or animations played in pre-rendered mode are always drawn in advance, and predetermine the play order of the pictures or animations. Therefore, when real-time mode switches to pre-rendered mode, a non-continuous display appears.

SUMMARY OF THE INVENTION

It is therefore an object of the present invention to provide a method for smooth transition that removes the non-continuous appearance when real-time mode switches to pre-rendered mode.

To achieve the above object, the present invention provides a one-dimensional smooth transition method between pre-rendered mode and real-time mode.

First, a plurality of precast pictures having a set order are provided, each including an object and an object-position corresponding to the object. Then, a former position and a current position of a pointer in real-time mode are recorded. If real-time mode switches to pre-rendered mode, the precast picture the object-position is closest to the current position is selected as a starting picture.

Then, a played direction according to the former position and the current position is obtained. Finally, the precast pictures from the starting picture according to the played direction and the set order are played.

Furthermore, the present invention also provides a two-dimensional smooth transition method between pre-rendered mode and real-time mode.

First, a plurality of precast pictures having a played order are provided, each including an object and an object-position corresponding to the object. Then, a former position and a current position of a pointer in real-time mode are recorded. If real-time mode switches to pre-rendered mode, the precast picture whose object-position is closest to the current position is selected as a starting picture.

Then, a smooth curve according to the object-position of the starting picture, the object-position of the precast picture next to the starting picture, the former position and the current position is obtained. Then, a plurality of connecting positions on the smooth curve are selected, and the object in these connecting positions from closest to farthest from the current position are drawn. Finally, the precast pictures from the starting picture according to the played order are played.

The number of transition positions is thus determined by the distance from the current position to the object-position of the starting picture. Namely, if the distance is longer, then the number of the connecting positions increases.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Referring to the accompanying figures, the preferred embodiments according to the present invention follows.

[First Embodiment]

Figure 1:
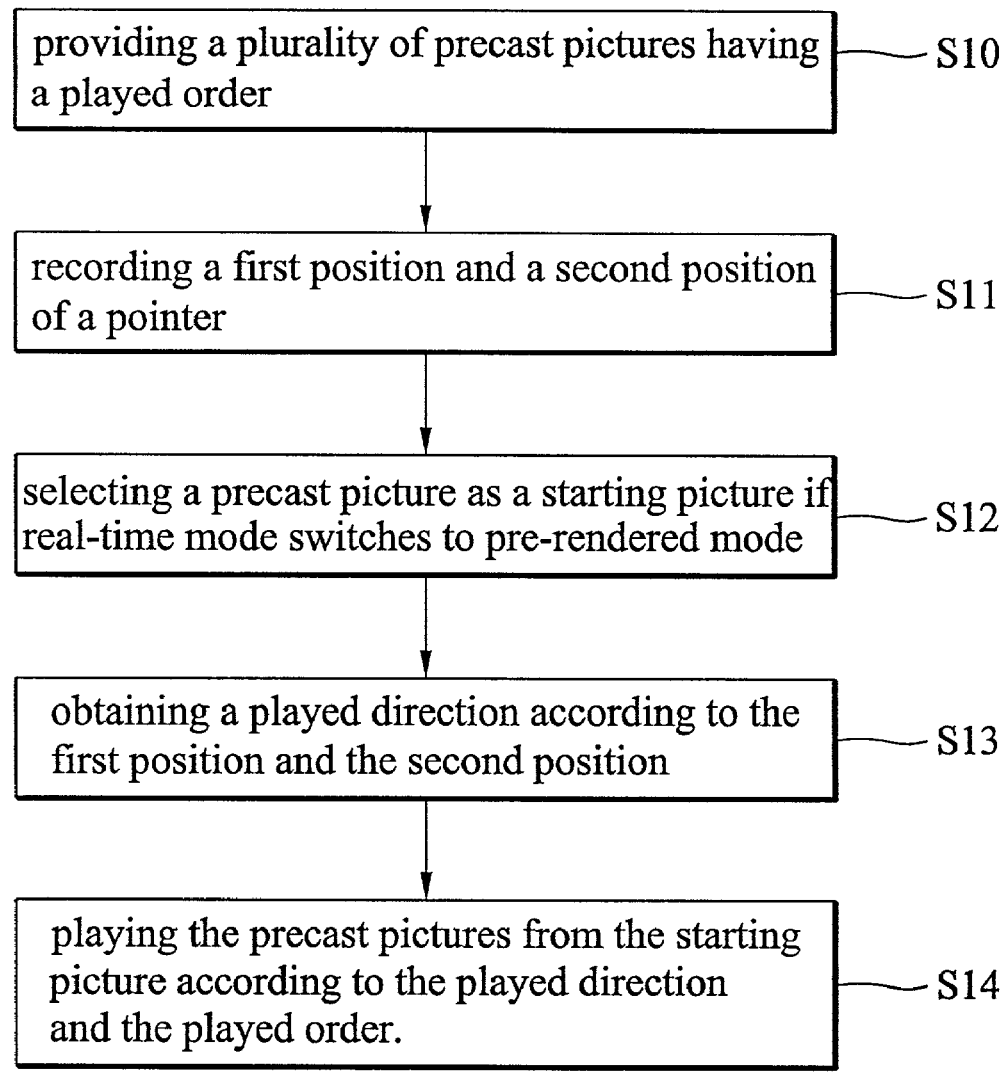
FIG. 1 is a flow chart illustrating the operation of a one-dimensional smooth transition method between pre-rendered mode and real-time mode according to the first embodiment of the present invention.

FIG. 1 illustrates the operation of a one-dimensional smooth transition method between pre-rendered mode and real-time mode according to the first embodiment of the present invention. Referring to FIG. 1, the first embodiment of the present invention is described in detail as follows.

The first embodiment of the present invention selects the best starting picture to play when real-time mode switches to pre-rendered mode, so as to remove the non-continuous appearance between real-time mode and pre-rendered mode.

First, in step S10, a plurality of precast pictures are provided. These precast pictures have a set order, and each of these precast pictures includes an object and an object-position corresponding to the object, wherein, the object-position can be recorded in the coordinate style.

Then, in step S11, a first and second position of a pointer in real-time mode are recorded. The second position is the current position of the pointer, and the first position is the former position prior to the second position. In other words, it will record the last two positions in real-time mode.

Then, in step S12, if real-time mode switches to pre-rendered mode, namely the pointer disappears or moves away, the precast picture whose object-position is closest to the second position is selected as a starting picture. In other words, the precast picture whose object-position is closest to the current position of the pointer is selected as the first picture of the pre-rendered mode to play. The distance from the object-position to the current position is derived from a first coordination of the object-position and a second coordination of the current position.

Then, in step S13, a played direction according to the former position and the current position is obtained. Finally, in step S14, the precast pictures from the starting picture according to the played direction and the set order are played.

Figure 2:
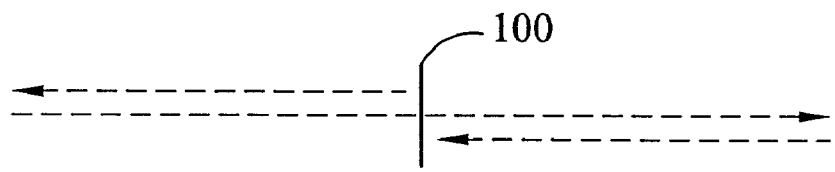
FIG. 2 is a schematic diagram showing an example of pre-rendered mode according to the first embodiment of the present invention.
Figure 3A:
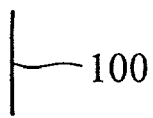
FIGS. 3a to 3i are precast pictures with different object-positions.
Figure 3B:
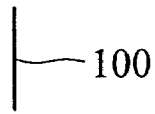
Figure 3C:
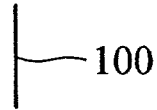
Figure 3D:
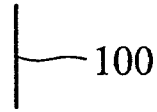
Figure 3E:
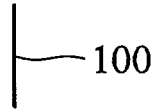
Figure 3F:
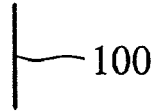
Figure 3G:
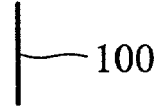
Figure 3H:
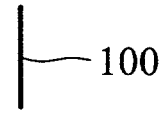
Figure 3I:
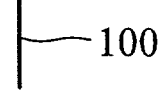

Next, FIG. 2 shows an example of pre-rendered mode according to the first embodiment of the present invention, and FIGS. 3a to 3i show the precast pictures that the object 100 is in different object-position. The animation formed by the precast pictures represents the object 100 moves from the middle to the left side, then moves through the middle to the right side, and the object 100 moved back and forth. Namely, the set order is FIG. 3e,3d, . . . ,3b,3a,3 b, . . . , 3h,3i,3h, . . . ,3b,3a,3b, . . . .

Figure 4:
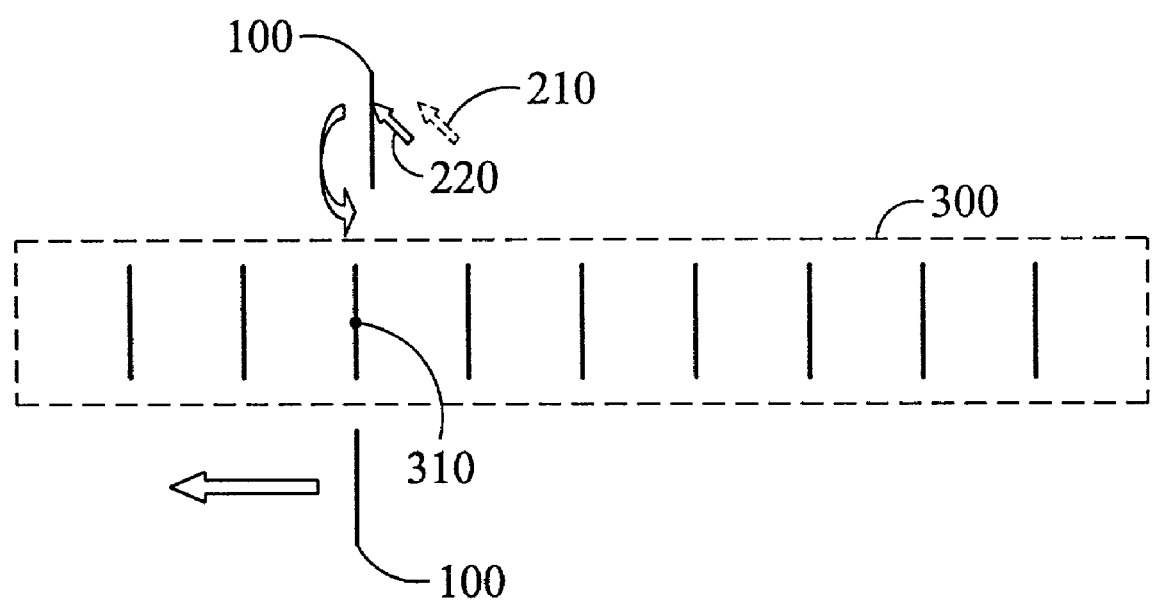
FIG. 4 is a schematic diagram showing the example in FIG. 2 switching to pre-rendered mode from real-time mode.

FIG. 4 is a schematic diagram showing the example in FIG. 2 switching to pre-rendered mode from real-time mode, referring to FIG. 4, the transition between real-time mode and pre-rendered mode is described as follow.

In real-time mode, the method of the present invention will record the current position 220 (second position) and the former position 210 (first position) of the pointer. If the interactive animation is switching to pre-rendered mode, the method will compute the distances from different object-positions of the object 100 in FIGS. 3a to 3i to the current position 220.

Then, the precast picture that includes the closest object-position 310 from block 300(the schematic block of the combination of FIGS. 3a to 3i.) is selected as a starting picture. In this case, the precast picture that includes the closest object-position 310 is FIG. 3c.

In addition, according to the former position 210 and the current position 220, we can obtain a played direction that moves to the left. Finally, according to the played direction and the set order described above, the precast pictures are played from the starting picture FIG. 3c. Namely, FIG. 3c,3b,3a,3b, . . . ,3h,3i,3h, . . . are exhibited in sequence.

[Second Embodiment]

Figure 5:
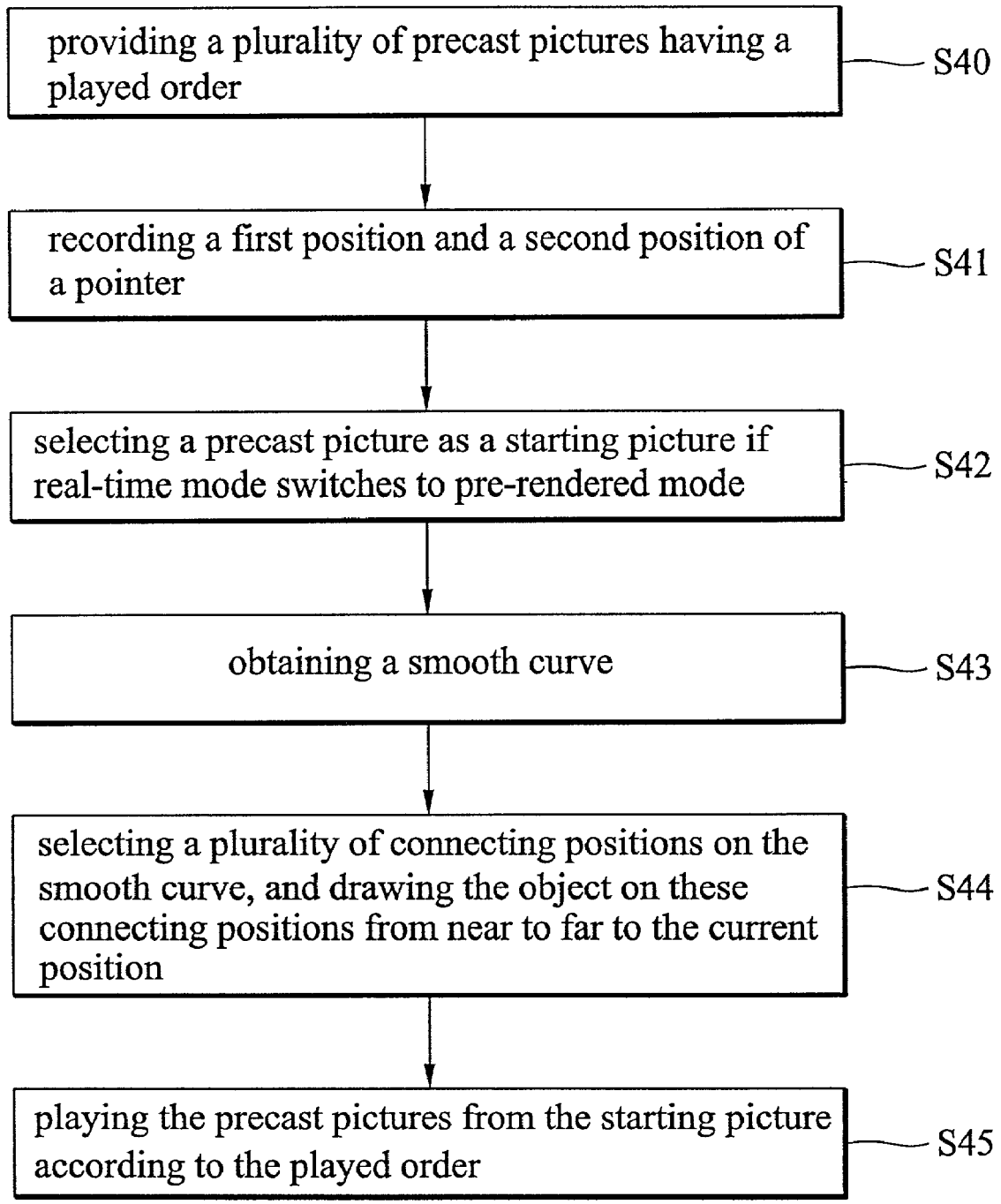
FIG. 5 is a flow chart illustrating the operation of a two-dimensional smooth transition method between pre-rendered mode and real-time mode according to the second embodiment of the present invention.

FIG. 5 illustrates the operation of a two-dimensional smooth transition method between pre-rendered mode and real-time mode according to the second embodiment of the present invention. Referring to FIG. 5, the second embodiment of the present invention is described as follow.

The second embodiment of the present invention is suitable for use in a two-dimensional interactive animation environment. First, in step S40, a plurality of precast pictures are provided in advance. These precast pictures have a set order, and each one of these precast pictures includes an object and an object-position corresponding to the object. The object-position can be recorded in the coordinate style.

Then, in step S41, a first position and a second position of a pointer are recorded in real-time mode. The second position is the current position of the pointer, and the first position is the former position previous to the second position. Namely, the method will record the last two positions in real-time mode.

Then, in step S42, if the interactive animation switches to pre-rendered mode, the precast picture whose object-position is closest to the second position is selected as a starting picture. In other words, the precast picture whose object-position is closest to the current position of the pointer is selected as the first picture of pre-rendered mode to play. Similarly, the distance from the object-position to the current position is derived from a first coordination of the object-position and a second coordination of the current position.

Then, in step S43, a smooth curve according to the object-position of the starting picture, the object-position of the precast picture next to the starting picture, the former position and the current position is obtained. The smooth curve can be a parabolic curve or a Bezier curve.

Then, in step S44, a plurality of connecting positions on the smooth curve are selected, the distances from the current position to each one of the connecting positions are computed, and the objects on these connecting positions from near to far to the current position are drawn. Similarly, the distance from the current position to the connecting position is derived from a third coordination of the connecting position and the second coordination of the current position.

Finally, in step S45, the precast pictures from the starting picture, according to the played order, are played. The number of transition positions is determined by the distance from the current position to the object-position of the starting picture. Namely, if the distance is longer then the number of the connecting positions increases. The aim of drawing the object on these connecting position is to remove the non-continuous appearance when real-time mode switches to pre-rendered mode.

Figure 6:
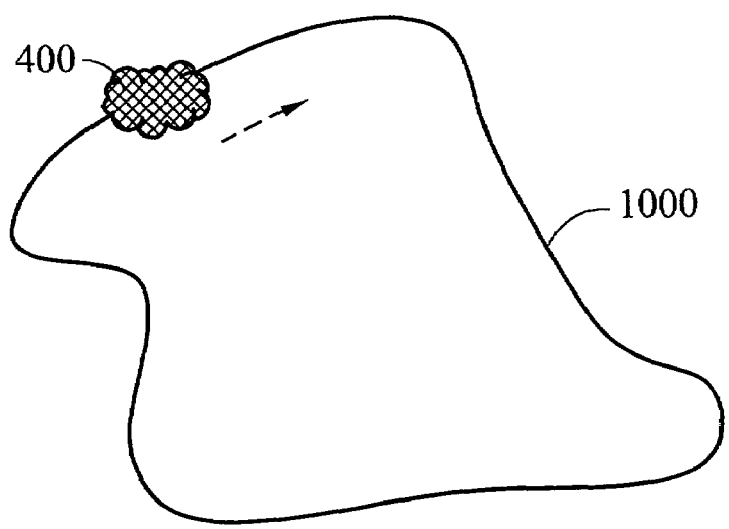
FIG. 6 is a schematic diagram showing an example of pre-rendered mode according to the second embodiment of the present invention.

Next, FIG. 6 shows an example of pre-rendered mode according to the second embodiment of the present invention. The animation represents the object 400 moving clockwise along the curve 1000. Similarly, the animation is composed of several precast pictures.

Figure 7:
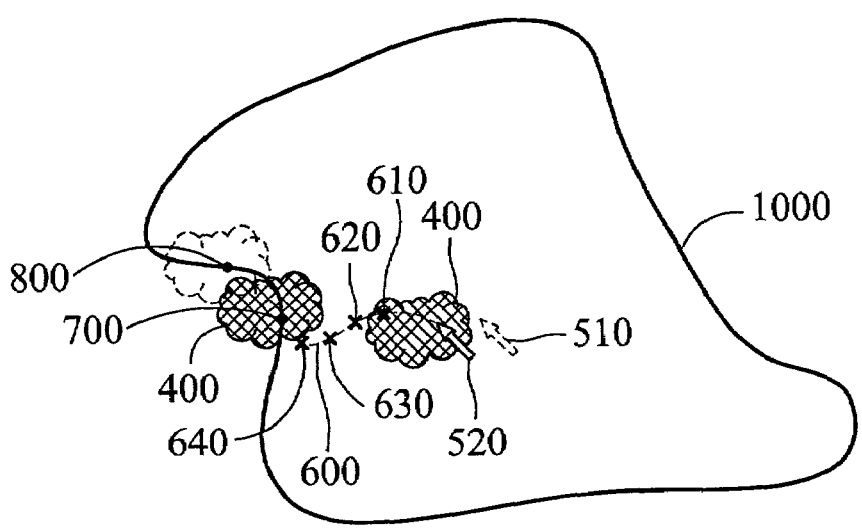
FIG. 7 is a schematic diagram showing the example in FIG. 6 to switch to pre-rendered mode from real-time mode.

FIG. 7 is a schematic diagram showing the example in FIG. 6 switching to pre-rendered mode from real-time mode, referring to FIG. 7, the transition between real-time mode and pre-rendered mode is described as follows.

In real-time mode, the present invention records the current position 520 (second position) and the former position 510 (first position) of the pointer. If the interactive animation switches to pre-rendered mode, the method will compute the distances from different object-positions of the object 400 in different precast pictures to the current position 520. Then, the precast picture that includes the closest object-position 700 is selected as a starting picture.

In addition, according to the object-position 700 of the starting picture, the object-position 800 of the precast picture next to the starting picture, the former position 510 and the current position 520, we can obtain a smooth curve 600.

Then, four connecting positions 610,620,630, and 640 are selected, the distances from the current position 520 to the selected connecting positions are computed respectively, and the objects 400 at these connecting positions from near to far to the current position are drawn. Namely, from the connecting position 610,620,630 to 640. Finally, according to the set order described above, the precast pictures from the starting picture are played.

As a result, using the smooth transition method of the present invention removes non-continuous appearance when real-time mode switches to pre-rendered mode.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for smooth transition between pre-rendered mode and real-time mode, comprising the steps of:
providing a plurality of precast pictures having a played order, each one of the precast pictures including an object and an object-position corresponding to the object;
recording a first position and a second position of a pointer in real-time mode;
selecting the precast picture whose object-position is closest to the second position as a starting picture if real-time mode switches to pre-rendered mode;
obtaining a played direction according to the first position and the second position; and
playing the precast pictures from the starting picture according to the played direction and the played order.

2. The method as claimed in claim 1 wherein the first position is a former position previous to the second position.

3. The method as claimed in claim 1 wherein the second position is a current position of the pointer.

4. A method for smooth transition between pre-rendered mode and real-time mode, comprising the steps of:
providing a plurality of precast pictures having a played order, each one of the precast pictures including an object and an object-position corresponding to the object;
recording a first position and a second position of a pointer in real-time mode;
selecting the precast picture whose object-position is closest to the second position as a starting picture if real-time mode switches to pre-rendered mode;
obtaining a smooth curve according to the object-position of the starting picture, the object-position of the precast picture next to the starting picture, the first position and the second position;
selecting a plurality of connecting positions on the smooth curve, and drawing the object on these connecting positions from nearest to farthest from the current position; and
playing the precast pictures from the starting picture according to the played order.

5. The method as claimed in claim 4 wherein the first position is a former position previous to the second position.

6. The method as claimed in claim 4 wherein the second position is a current position of the pointer.

7. The method as claimed in claim 4 wherein the number of transition positions is determined by the distance from the current position to the object-position of the starting picture.

* * * * *